United States Patent [19]

Itoh et al.

[11] Patent Number: 4,925,236
[45] Date of Patent: May 15, 1990

[54] AUTOMOTIVE AIR SPOILER DEVICE

[75] Inventors: Norihisa Itoh; Kiyoshi Kawaguchi, both of Anjo; Etsuji Nomura, Ichinomiya, all of Japan

[73] Assignee: Nippondenso Co., Ltd., Kariya, Japan

[21] Appl. No.: 196,465

[22] Filed: May 20, 1988

[30] Foreign Application Priority Data

May 22, 1987 [JP] Japan .................................. 62-125555
Apr. 8, 1988 [JP] Japan .................................. 63-85144

[51] Int. Cl.⁵ ............................................. B62D 35/00
[52] U.S. Cl. ............................... 296/180.5; 296/180.1
[58] Field of Search ............... 296/180.1, 180.2, 180.3, 296/180.4, 180.5, 185, 195

[56] References Cited

U.S. PATENT DOCUMENTS

| | | | |
|---|---|---|---|
| 4,433,865 | 2/1984 | Crompton | 296/180.4 X |
| 4,660,879 | 4/1987 | Kobayashi et al. | |

FOREIGN PATENT DOCUMENTS

| | | | |
|---|---|---|---|
| 175808 | 4/1952 | Austria | 296/180.1 |
| 1009501 | 5/1957 | Fed. Rep. of Germany | 296/180.1 |
| 2928342 | 2/1981 | Fed. Rep. of Germany | 296/180.1 |
| 3620843 | 12/1987 | Fed. Rep. of Germany | 296/180.5 |
| 560594 | 1/1959 | Italy | 296/180.1 |
| 560498 | 2/1959 | Italy | 296/180.1 |
| 57-51581 | 3/1982 | Japan . | |
| 57-95266 | 6/1982 | Japan . | |
| 57-143985 | 9/1982 | Japan . | |
| 189780 | 9/1984 | Japan . | |
| 60-161276 | 8/1985 | Japan . | |
| 163772 | 8/1985 | Japan | 296/180.1 |
| 60-183252 | 9/1985 | Japan . | |
| 60-209369 | 10/1985 | Japan . | |
| 61-67676 | 4/1986 | Japan . | |
| 67676 | 4/1986 | Japan . | |
| 71763 | 4/1987 | Japan | 296/180.5 |
| 62-163875 | 7/1987 | Japan . | |
| 48710 | 10/1987 | Japan | 296/180.1 |

*Primary Examiner*—Margaret A. Focarino
*Assistant Examiner*—Joseph D. Pape
*Attorney, Agent, or Firm*—Cushman, Darby & Cushman

[57] ABSTRACT

An automotive air spoiler device has a pair of wing spoiler members provided on the left and right sides of the tail of an automobile body. Each wing spoiler member is disposed along each lateral side of the tail of the automobile body and extends obliquely outwardly from the automobile body. The wing spoiler members effectively interrupt air which tends to move from respective lateral sides of the tail of the automobile body to one of the upper side, rear side and the underside of the automobile body so as to prevent generation of a negative pressure region on the lateral sides of the tail of the automobile body, thereby ensuring high straight running stability of the automobile during running under the action of a lateral wind.

1 Claim, 11 Drawing Sheets

AUTOMOTIVE AIR SPOILER DEVICE

BACKGROUND OF THE INVENTION

The present invention relates to an air spoiler device mounted on the tail or rear section of an automobile. More particularly, the present invention is concerned with an air spoiler device which reduces yawing moment acting on the automobile to ensure stable running of the automobile.

Air spoiler devices have been known which make positive use of stream of air along automobiles to ensure stability during running of the automobile. Hitherto, various types of air spoiler device have been known such as (1) those intended for reducing resistance of air or reducing lift acting on the body of the automobile, (2) those intended for preventing front or rear window from being dirty with dust or rain, and (3) those intended for ensuring high running stability against external forces such as that produced by a side or lateral wind, by means of, for example, vertical fins. These air spoiler devices are disclosed, for example, in Japanese Patent Examined Publication Nos. 57-51581 and 57-95266, as well as in Japanese Patent Unexamined Publication Nos. 60-161276 and 60-183252.

A side or lateral wind acting on an automobile cruising at a high speed, regardless of whether it is a rush wind or a steady wind, produces a lateral force and yawing moment, with the result that the running stability of the automobile is seriously impaired. The chance of high-speed cruising is increasing even for ordinary drivers, due to the current development of expressway networks.

The above-mentioned known air spoiler devices are mainly intended for reducing air flow resistance and/or the lift acting on the automobile or for preventing contamination of window glasses, and are not effective in improving running stability against a lateral wind. The air spoiler of the type (3) mentioned above produces a noticeable effect in the reduction of the yawing moment. However, this type of air spoiler device is still unsatisfactory insofar as it relies upon aerodynamic force acting on the vertical fins or the like. Namely, in order to obtain an appreciable effect with this type of air spoiler device, it is necessary that the size of the device be increased to such an extent that cannot be legally accepted.

SUMMARY OF THE INVENTION

Accordingly, an object of the present invention is to provide a simple and compact automotive air spoiler device which makes an appreciable contribution to improvement in the straight running stability of automobile against lateral wind.

Another object of the present invention is to provide an automotive air spoiler device which can improve the straight running stability of automobile against a lateral force, without causing any increase in the resistance of air during running of the automobile.

The invention is based upon the discovery of a fact that a lateral wind acting on an automobile running at high speed produces a composite wind which generates a negative pressure region on the tail of the automobile such as to pull the tail of the automobile body towards the upstream side of the wind, thereby increasing the yawing moment which is the moment acting around the centroid of the automobile. Thus, the air spoiler device of the present invention is to eliminate or substantially reduce the generation of the negative pressure region so as to reduce the yawing moment, thereby improving the running stability of the automobile.

To these ends, according to one aspect of the present invention, there is provided an automotive air spoiler device having a pair of air spoiler members disposed on the tail of an automobile at the left and right sides of the automobile, the spoiler members extending obliquely outwardly from the automobile body in such a manner as to prevent air from flowing from both lateral sides of the tail of the automobile to the upper, rear and lower sides of the tail of the automobile.

With this arrangement, each air spoiler member increases the side elevational area at the tail of the automobile on each lateral side. In addition, the air spoiler member which extends obliquely outwardly from the automobile body serves to partially interrupt the air which tends to flow from the lateral side to the rear side of the automobile body. Therefore, when the automobile runs under a side or lateral wind, the air moving the lateral side of the automobile body on the upstream side as viewed in the direction of the wind is interrupted at the tail of the automobile body so that the velocity of flow of the air is decreased to reduce the tendency of generation of the negative pressure region. In consequence, the pulling force acting on the tail of the automobile body is reduced and, in addition, the force produced by the dynamic pressure of the lateral wind is increased due to the increased side elevational area of the automobile body, whereby the tail of the automobile body is aerodynamically urged towards the downstream side of the lateral wind. This urging force well negates the yawing moment acting around the centroid of the automobile so as to nullify or reduce the yawing moment, thus providing a higher straight running stability of the automobile against a lateral wind.

According to another aspect of the present invention, each of the air spoiler members is curved such that the center of the curvature is positioned outside the automobile body or, alternatively, bent at at least a portion thereof to follow such a curvature. The air spoiler member thus shaped to have a curved or hook-shaped cross-section produces a greater effect in interrupting the flow of air on the lateral side of the automobile body, thus contributing to a further improvement in the straight running stability of the automobile.

The above and other objects, features and advantages of the present invention will become clear from the following description of the preferred embodiments when the same is read in conjunction with the accompanying drawings.

DESCRIPTION OF THE PREFERRED EMBODIMENTS

Preferred embodiments of the present invention will be described hereinunder with reference to the accompanying drawings.

Figure 1:
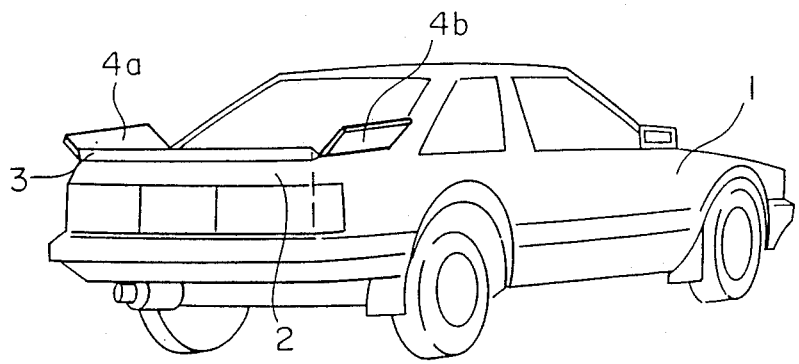
FIG. 1 is a perspective view of an automobile equipped with a first embodiment of the air spoiler device in accordance with the present invention.
Figure 2:
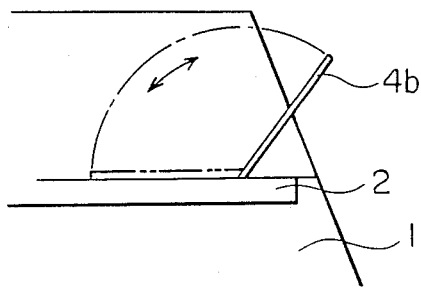
FIG. 2 is a schematic illustration of the wind spoiler incorporated in the first embodiment, illustrating particularly the manners in which the wing spoiler is developed and stored.
Figure 3:
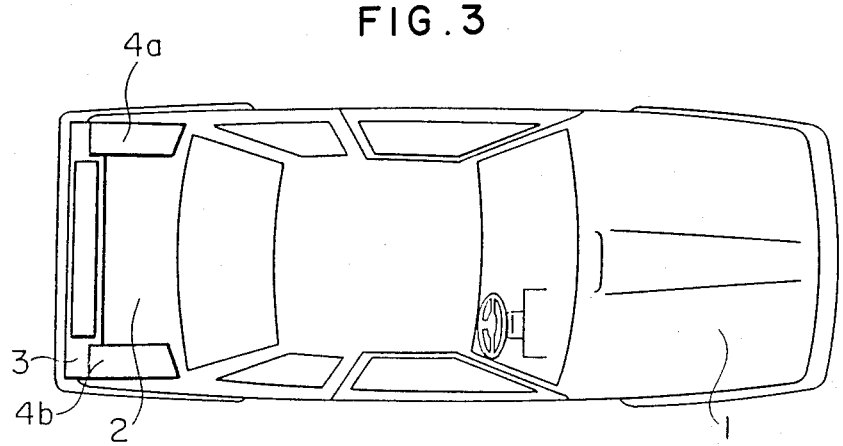
FIG. 3 is a top plan view of the automobile shown in FIG. 1.
Figure 4:
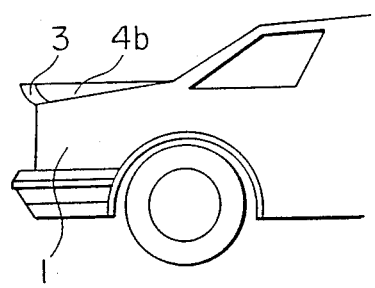
FIG. 4 is a side elevational view of the tail portion of the automobile shown in FIG. 1.

Referring to FIG. 1, an automobile 1 is provided on the tail or rear thereof with a first embodiment of the air spoiler device of the present invention. This embodiment of the air spoiler device includes a rear spoiler member 3 mounted on the upper rear end of a trunk lid 2 and a pair of wing-type air spoiler members 4a and 4b on both lateral sides of the rear spoiler member 3. These wing-type spoiler members 4a and 4b will be combinedly referred to as wind spoiler members, hereinafter. The wing spilers 4a and 4b have generally elongated tabular forms and are mounted on the left and right lateral sides of the automobile 1, respectively, such as to extend in parallel with the lateral side surfaces of the automobile 1. Each wing spoiler member is mounted pivotally so that it can extend laterally outwardly from the automobile when it is developed, as shown in FIG. 2. When stored, each wing spoiler member is placed substantially within the configuration or profile of the automobile body.

Both the rear spoiler member 3 and the wing spoiler members 4a, 4b are made of a material such as polyurethane resin or the like, and are designed such that the rear spoiler member 3 and the wing spoiler members 4a, 4b provide substantially continuous face when the wing spoiler members 4a, 4b are in the storage positions. The rear spoiler member 3 is provided for the purpose of preventing the tail of the automobile from floating during running of the automobile, and may have any known form.

Figure 5:
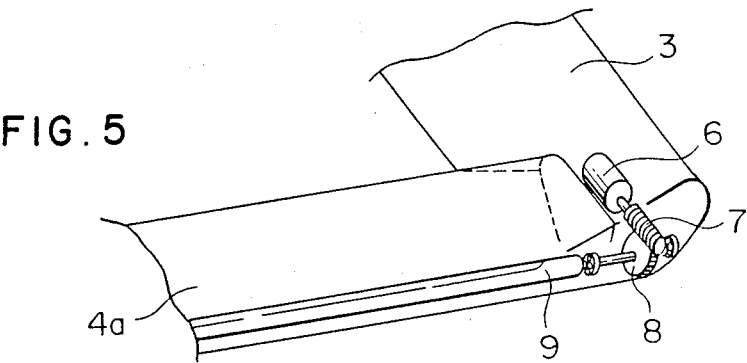
FIG. 5 is a transparent view of an essential part of the first embodiment, illustrating particularly a wing spoiler driving mechanism.

FIG. 5 shows a mechanism for driving the wing spoiler members. The mechanism includes an electric motor 6 disposed inside the rear spoiler member 3 at each lateral side of the automobile. The motor 6 has an output shaft carrying a worm gear 7. On the other hand, each wing spoiler member, exemplarily indicated at 4a in FIG. 5, has a shaft 9 fixed thereto and extending along the length thereof. The shaft 9 is rotatably supported by a bearing disposed in the rear spoiler member and a bearing which is fixed to the upper surface of the trunk lid by means of, for example, bolts. A worm wheel gear 8 attached to the rear end of the shaft 9 meshes with the worm gear 7 on the output shaft of the motor 6 so that the torque of the motor 6 is transmitted to the wing spoiler member.

Figure 7:
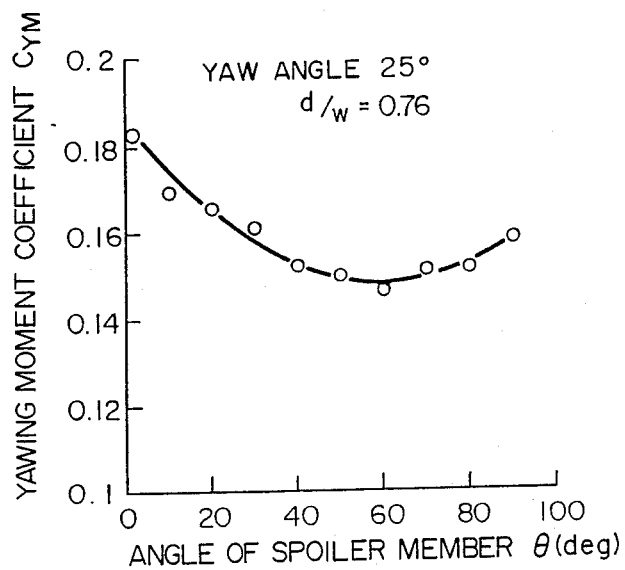
Figure 8A:
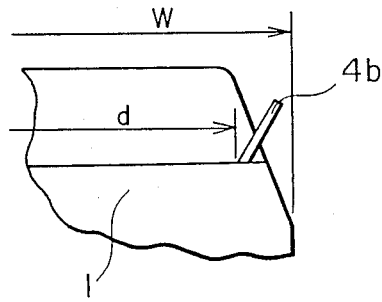
FIG. 8a and 8b are schematic illustrations of the air spoiler device explanatory of the assumption for obtaining the setting conditions as shown in FIGS. 6 and 7.
Figure 8B:
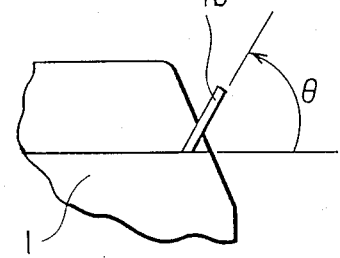

The size of the wing spoiler member may freely be selected according to the type of the automobile and other conditions. In the illustrated embodiment, the wind spoiler member has a length of 600 mm and a width of 200 mm. This size is generally adaptable to ordinary passenger cars. In order to find optimum position and angle of the wing spoiler member, an experiment was conducted using a 1/10 scale model placed in a wind tunnel, the result of which is shown by graphs in FIGS. 6 and 7. In these graphs, the axes of ordinate represent yawing moment coefficient $C_{YM}$ which is the dimensionless value of the yawing moment around the centroid of the automobile body. On the other hand, the axes of abscissa represent the spoiler spacing ratio d/w and the angle $\theta$ of each spoiler member. The term "spoiler spacing ratio" is used in this specification to mean the ratio between the distance d between the left and right wing spoiler members and the overall width w of the automobile 1 as shown in FIG. 8a. On the other hand, the term angle $\theta$ of spiler member is the angle at which the wing spoiler member is inclined with respect to the mounting surface when the wing spoiler member is developed as shown in FIG. 8b.

Figure 6:
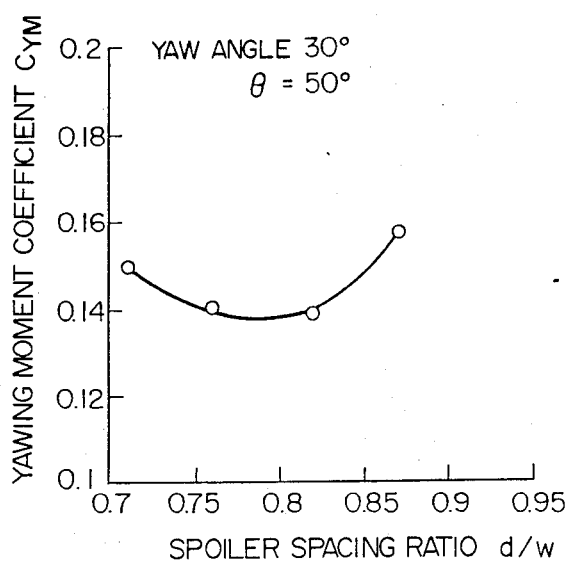
FIGS. 6 and 7 are graphs illustrating the conditions of setting of the air spoiler device of the present invention.

The result of experiment as shown in FIG. 6 has been obtained under such conditions that the angle $\theta$ of spoiler member is fixed at 50° and that the composite wind composed of a running wind (natural draft caused by running of the automobile) and a side or lateral wind acts in the direction of 30° to the direction in which the automobile is headed, i.e., that the yawing angle is 30°, while varying the value of the spoiler spacing ratio. On the other hand, FIG. 7 shows how the yawing moment coefficient $C_{YM}$ is changed in relation to a change in the angle $\theta$ of the spoiler member when the spoiler spacing ratio d/w is fixed at 0.76 and the yaw angle of the composite wind is 25°. From these Figures, it is understood that the yawing moment coefficient is minimized when the spoiler spacing ratio d/w is 0.79 and when the angle $\theta$ of each spoiler member is 60°, respectively. This means that there exists certain limitation in the conditions of setting the wing spoiler members. Preferably, the setting conditions are selected to fall within the ranges which include the respective points of conditions for minimizing the yawing moment coefficient and which make the yawing moment coefficient fall within a predetermined range which is practically plus/minus 5% of the minimum value of the yawing moment coefficient. In such a case, the spoiler spacing ratio of d/w falls between 0.75 and 0.83, while the angle $\theta$ of the spoiler ranges between 40° and 70°.

Figure 9:
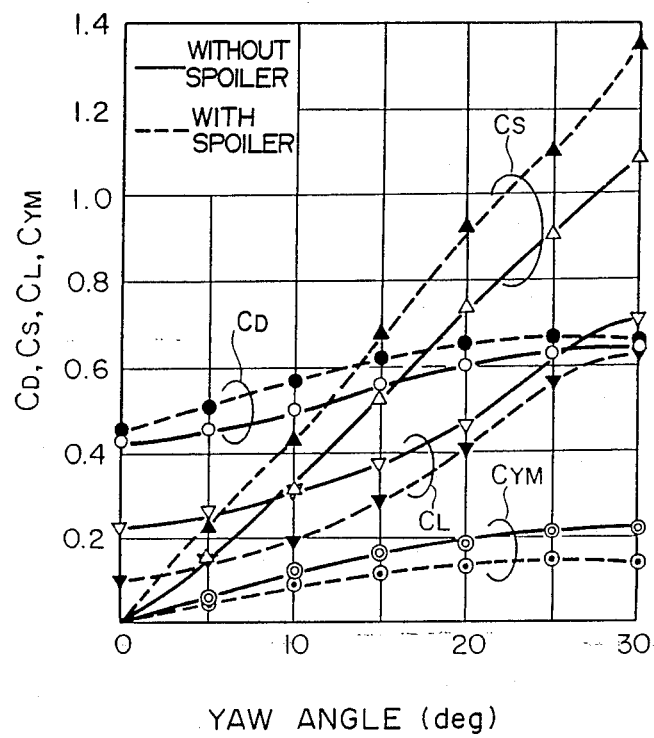
FIG. 9 is a graph showing the aerodynamic characteristics of the automobile equipped with the first embodiment of the air spoiler device of the present invention.

FIG. 9 is a graph showing the result of an experiment conducted for the purpose of measuring the aerodynamic characteristics of an automobile equipped with the first embodiment of the air spoiler device in accordance with the invention, by employing a 1/10 scale model. The axis of abscissa represents the yaw angle of the composite wind, while the resistance coefficient $C_D$, lateral force coefficient $C_S$, lift coefficient $C_L$ and the yawing moment coefficient $C_{YM}$ are plotted along the axis of ordinate. These coefficients $C_D$, $C_S$ and $C_L$ are dimensionless values of the aerodynamical forces $F_X$, $F_Y$ and $F_Z$ acting on the centroid of the automobile in the counter direction, lateral direction and vertical direction, respectively. The yawing moment coefficient $C_{YM}$ is the dimensionless value of the yawing moment M around the centroid of the automobile body. These coefficients are derived from the following formulae:

$$C_{D,S,L} = F_{X,Y,Z}/(\tfrac{1}{2} \cdot \rho \cdot U^2 \cdot S)$$

$$C_{YM} = M/(\tfrac{1}{2} \cdot \rho \cdot U^2 \cdot S \cdot L)$$

where, S represents the front projection area of the automobile body, while L represents the wheel base of the automobile. A symbol $\rho$ represents density of air.

Figure 10:
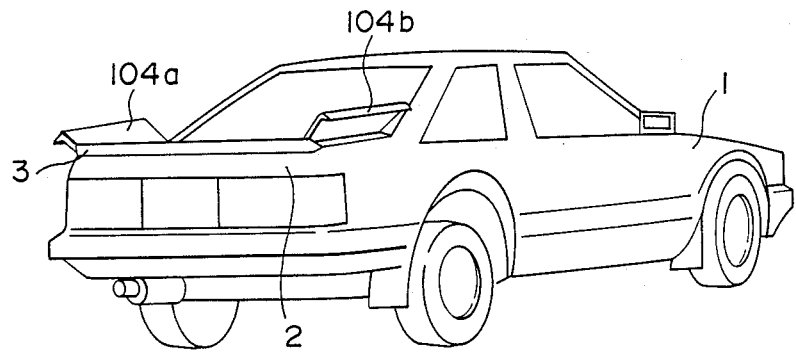
FIG. 10 is a perspective view of an automobile equipped with a second embodiment of the air spoiler device in accordance with the present invention.
Figure 11:
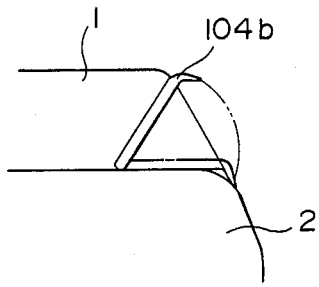
FIG. 11 is a view similar to FIG. 1 but showing the second embodiment of the invention.

From the test result shown in FIG. 9, it will be understood that the air spoiler device of the described embodiment remarkably reduces the yawing moment coefficient $C_{YM}$ regardless of the yaw angle, thus proving a remarkable effect in improving the straight running stability of the automobile. It is also understood that the lift coefficient $C_L$ during running against a yaw angle of 0°, i.e., when there is no lateral wind, can be appreciably reduced by virtue of the provision of the rear spoiler member. FIG. 10 shows a second embodiment of the automotive air spoiler device of the present invention. In the following description, the same reference numerals are used to denote the same parts or members as those used in the first embodiment of the invention, and detailed description of such parts or members is omitted to simplify the description. As in the case of the first embodiment of the invention, the second embodiment of the air spoiler device of the invention includes a rear spoiler member 3 fixed on the rear trunk lid 2 of the automobile 1. A pair of wing spoiler members 104a, 104b are provided on both lateral sides of the rear spoiler member 3. These wing spoiler members have elongated forms extending substantially along the lateral sides of the automobile 1 and are pivotally secured to the body of the automobile. As will be seen from FIG. 11, each wing spoiler member is curved about a center of curvature which is located outside the automobile body and such as to have a substantially hooked cross-sectional shape so as to enhance its effect in interrupting the flow of air along the lateral sides of the automobile. The wing spoiler member, when developed, projects obliquely outwardly from the body of the automobile with its extreme end substantially opposing the lateral wind component of the air flow on the lateral side of the automobile body. The wing spoiler member, when stored, is laid down to conform with the curvature of the surface of the automobile body as shown in FIG. 11.

Figure 12:
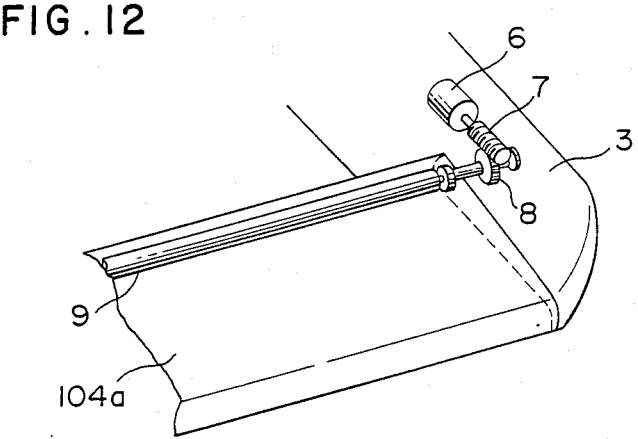
FIG. 12 is a view similar to FIG. 5 but showing the second embodiment of the invention.

Similarly to the driving device for driving the air spoiler members of the first embodiment of the invention, the mechanism for driving the air spoiler member of the second embodiment includes electric motors 6 provided in the rear spoiler member 3, worm gears 7, shafts 9 fixed to the wing spoiler members and worm wheel gears 8 provided on the shafts 9, as will be seen from FIG. 12. In this embodiment, however, the shaft 9 is carried at a position closer to the breadthwise center of the automobile body than in the first embodiment of the invention, so that the wing spoiler member in the second embodiment of the invention is adapted to be swung in a direction which is counter to the direction of swing of the air spoiler member 4b in the first embodiment of the invention, as will be realized from a comparison between FIG. 2 and FIG. 11.

Figure 13:
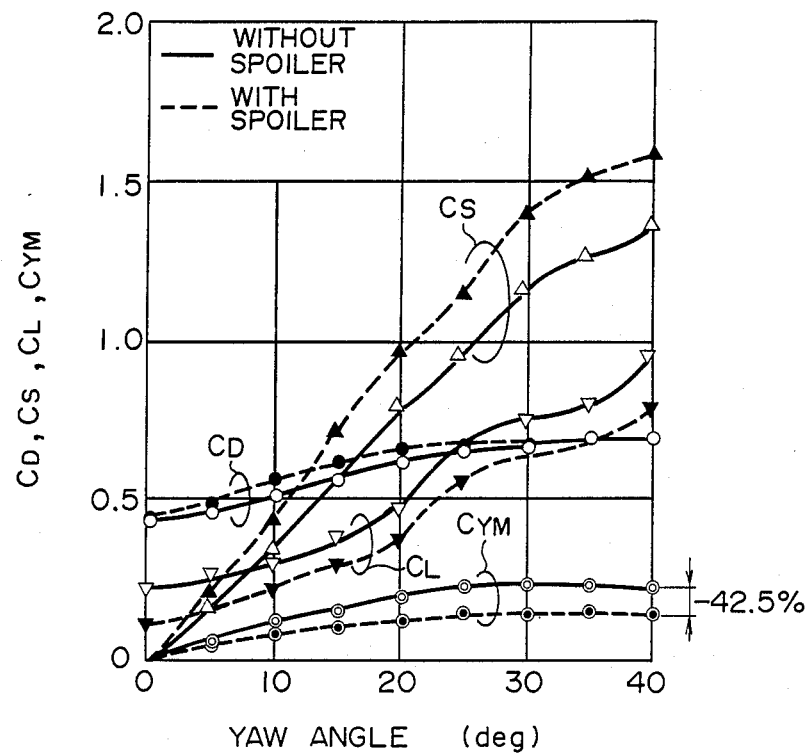
FIG. 13 is a graph showing the aerodynamic characteristics of an automobile equipped with the second embodiment of the air spoiler device in accordance with the present invention.

FIG. 13 is a graph illustrating the aerodynamic characteristics of an automobile equipped with the second embodiment of the air spoiler device of the present invention. The characteristics shown in FIG. 13 have been obtained through a measurement carried out under the same conditions as those in the measurement of the characteristics shown in FIG. 9. It will be seen that a remarkably large reduction in the yawing moment $C_{YM}$ of $-42.5\%$ has been attained to ensure a high straight running stability of the automobile. It is clear that the air spoiler device of the second embodiment of the invention greatly contribute to the straight running stability of the automobile.

Although the illustrated air spoiler member in the second embodiment of the invention is progressively curved to provide a hook-shaped cross-section, it will be obvious to those skilled in the art that the same result is obtainable with spoiler members which are bent at at least one portion thereof so as to provide a similar hook-shaped cross-section.

A description will be made hereinunder as to the function of the air spoiler device in accordance with the present invention.

Figure 14A:
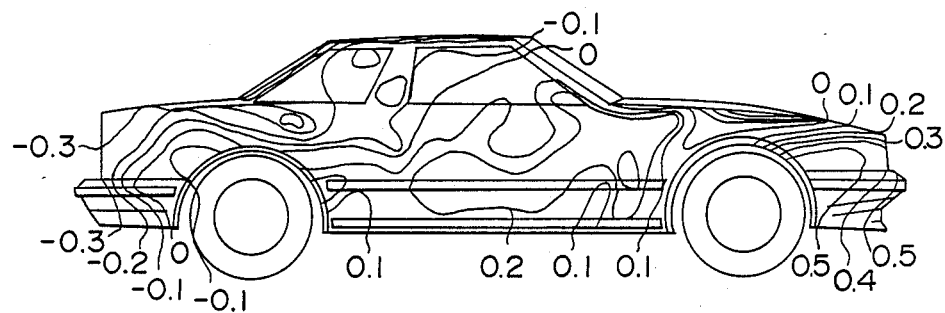
FIG. 14a is a graph showing the air presssure distribution on a lateral side of an automobile running in a lateral wind.

As explained before, an automobile running under action of a lateral wind encounters a composite wind which is composed of a running wind component and a lateral wind component and which acts at an angle to the direction for which the automobile is headed. The composite wind acting obliquely on the automobile body from the front side thereof serves to urge the front of the automobile towards the downstream side as viewed in the direction of the composite wind, so that a yawing moment is generated tending to turn the automobile about the centroid thereof. The wind further flows along the lateral side of the automobile body on the upstream side as viewed in the direction of the wind, and is exfoliated from the tail of the automobile body. A measurement was conducted to examine the actual air pressure distribution on the lateral side of the tail of an automobile, the result of which is shown in FIG. 14a. The measurement was conducted using a 1/10 scale model of a passenger car, under the conditions of yaw angle of 30° and composite wind velocity of 20 m/sec. As will be clearly seen from FIG. 14a, a negative pressure region is formed in the rear lateral side of the automobile body except the central portion. The negative pressure region produces a force which acts to pull the tail of the automobile body towards the upstream side as viewed in the direction of the wind, thus increasing the yawing moment around the centroid of the automobile body. In FIG. 14a, the states of air pressure are shown in terms of pressure coefficient $C_P$ which is a dimensionless value of the pressure P on the surface of the automobile body in accordance with the following formula:

$$C_P = P/(\tfrac{1}{2} \cdot \rho \cdot U^2)$$

where, $\rho$ represents the density of air, while U represents the velocity of the composite wind.

In contrast, the obliquely outwardly projecting air spoiler member on the upstream side as viewed in the direction of the lateral wind serves to partially interrupt the air which is leaving the upper side of the tail of the automobile body and also to induce the air to the lateral area of the tail of the automobile body along the spoiler member. In consequence, the negative pressure region on the lateral side of the tail of the automobile is reduced, i.e., the absolute pressure is increased, thereby to eliminate or reduce the negative pressure region.

Figure 14B:
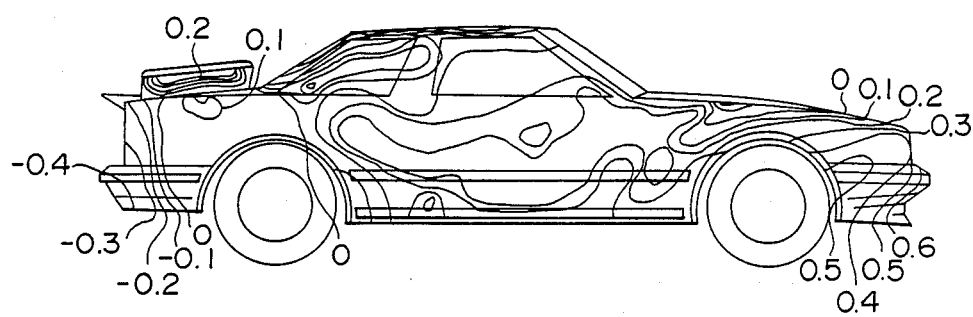
FIG. 14b is a graph similar to that of FIG. 14a, illustrating the air pressure distribution as observed when the automobile is equipped with the second embodiment of the air spoiler device of the present invention.

FIG. 14b shows the result of measurement which was conducted by employing the above-mentioned 1/10 scale model of passenger car equipped with the second embodiment of the air spoiler device of the invention scaled down in proportion to the automobile body. The measuring condition were the same as that explained above in connection with FIG. 14a. From the comparison between FIG. 14a and FIG. 14b, it is readily understood that the negative pressure region on the lateral side of the tail of the automobile body is remarkably reduced and changed into positive pressure region, by virtue of the provision of the wing spoiler members 104b. In consequence, the suction force which has been produced by the negative pressure is reduced or eliminated. In addition, the force produced by the dynamic pressure of the lateral wind acting on the lateral side of the automobile body is increased by virtue of the increased side elevational area. Partly because of the reduced or eliminated suction force and partly because of the increased force produced by the dynamic pressure of the lateral wind, the tail of the automobile body is urged to the downstream side as viewed in the direction of the wind, thus contributing to reduction in the yawing moment.

Hitherto, a problem has been encountered with automobiles running in the presence of a lateral wind that the straight running stability is seriously impaired due to the fact that the front of the automobile body is pushed to the downstream side while the tail of the same is pulled to the upstream side as viewed in the direction of the lateral wind. This tendency, however, is suppressed by the provision of the air spoiler device of the present invention because the spoiler device serves to force back the tail of the automobile body to the downstream side as viewed in the direction of the lateral wind, so that the straight running stability of the automobile is remarkably improved. It is to be understood that the air spoiler device of the present invention makes an effective use of dynamic pressure of the lateral wind as in the case of conventional spoiler with vertical fins and, in addition, aerodynamically improves the profile of the tail of the automobile body such as to optimize the air pressure distribution on the tail of the automobile body.

Figure 15:
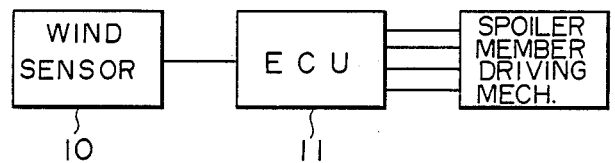
FIG. 15 is a block diagram of a control circuit used in the first and the second embodiments of the air spoiler device in accordance with the present invention.

The first and the second embodiments of the air spoiler device of the present invention described hereinbefore are provided with a control device for storing or extending the wing spoiler members in accordance with the state of the lateral wind. This control device will be described hereinunder. As will be seen from the block diagram of FIG. 15, the control device has a wind sensor 10 and an electronic control unit 11, and is connected to the wing spoiler driving mechanism mentioned before. The wind sensor 10 may be constituted by a known sensor such as a pilot yaw sensor, supersonic wind direction/velocity meter or the like.

Figure 16:
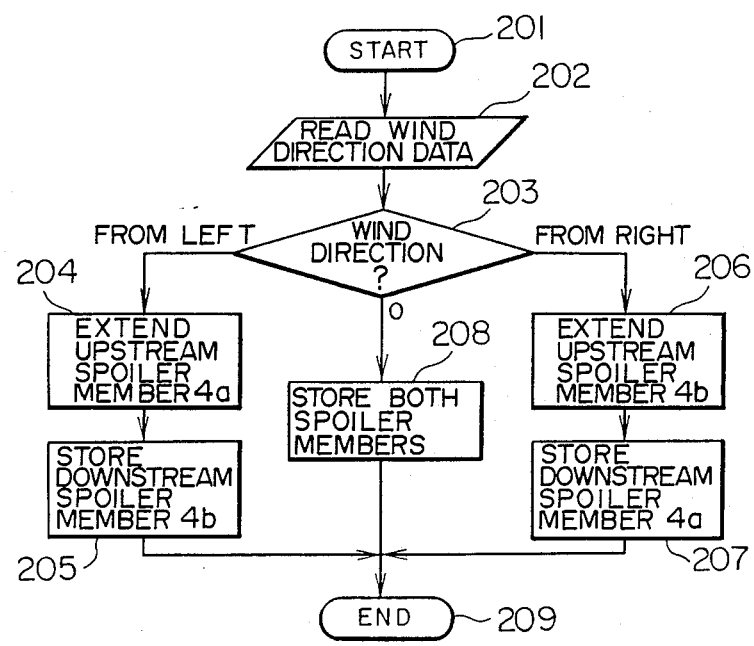
FIG. 16 is a flow chart illustrating the flow of arithmetic operation performed by an electronic unit used in the first and the second embodiments of the present invention.

In response to lateral wind data derived from the wind sensor 10, the electronic control unit performs an arithmetic operation which is shown in FIG. 16. Namely, the arithmetic operation is started at Step 201, and the wind direction data is read from the wind sensor 10 in Step 202. Subsequently, in Step 203, the wind direction is judged and, when it is judged that the wind is from the left side of the running automobile, the process proceeds to Step 204 in which an operation signal is produced to extend the wing spoiler member 4a (104a in the case of the second embodiment of the invention) on the lateral side of the automobile body which is upstream as viewed in the direction of the wind. On the other hand, an operation signal is issued and delivered to the driving mechanism of the downstream side air spoiler member 4b (104b) so as to store the downstream wing spoiler member 4b (104b). When the wind is from the right side of the automobile body, an operation signal for extending the upstream wing spoiler member 4b (104b) is issued in Step 206 and, in Step 207, an operation signal is delivered to the driving mechanism associated with the downstream wing spoiler member 4a (104a) to store this wing spoiler member. If the wind direction is 0°, i.e., when the wind is against, operation signals for storing both wing spoiler members is issued in Step 208 and then the process proceeds to Step 209 to complete one cycle of arithmetic operation routine.

Figure 17:
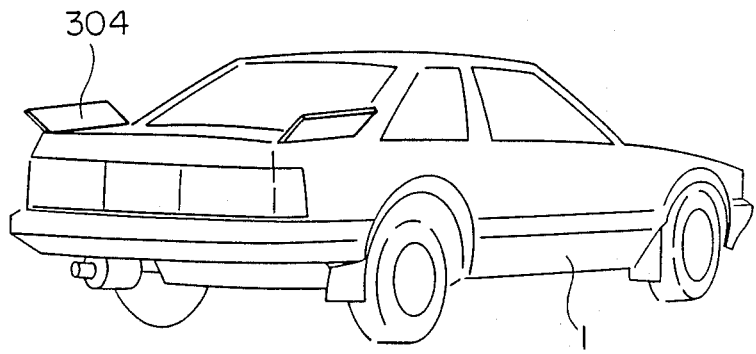
FIG. 17 is a perspective view of an automobile equipped with a third embodiment of the air spoiler device in accordance with the present invention.

FIG. 17 shows a third embodiment of the air spoiler device in accordance with the present invention. In contrast to the first and the second embodiments of the invention in which the wing spoiler members are combined with the rear spoiler member, the third embodiment of the invention does not employ the rear spoiler member. Namely, in the third embodiment of the invention, a pair of wing spoiler members alone are provided on the left and right sides on the top of the tail of the automobile body. The driving mechanisms for driving the respective wing spoiler members are mounted within the rear trunk. The driving meachanisms may be the same as those explained in connection with the first embodiment of the invention and, therefore, detailed description is omitted in connection with the driving mechanisms. The function of the air spoiler device of the third embodiment of the invention is materially the same a those derived from the first and the second embodiments of the invention. Namely, the air spoiler device of the third embodiment of the invention operates to form an air flow path which interrupts a lateral wind at the upstream lateral side of the automobile body, and induces the air to the rear side of the automobile body thereby to change a negative pressure region on the rear of the automobile body into a positive pressure region, thus forcing back the tail of the automobile body to the downstream side as viewed in the direction of the wind.

Figure 18:
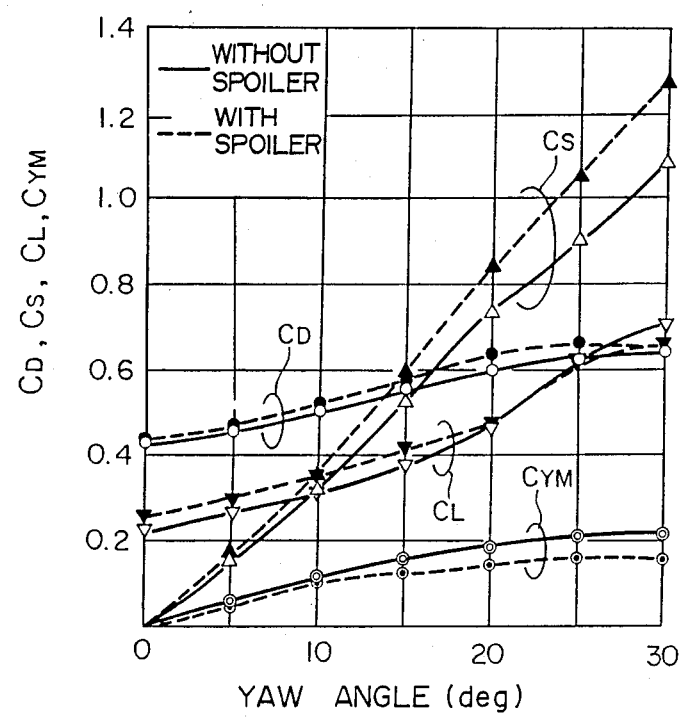
FIG. 18 is a graph illustrating the aerodynamic characteristics of an automobile equipped with a third embodiment of the air spoiler device in accordance with the present invention.

FIG. 18 shows the result of measurement of the aerodynamic characteristics of automobile provided with the third embodiment of the air spoiler device of the present invention, as measured with a 1/10 scale model of a passenger car. From this Figure, it will be understood that the third embodiment of the air spoiler device of the present invention produces a remarkable effect in reducing the yawing moment produced by lateral wind acting on a running automobile.

Figure 19:
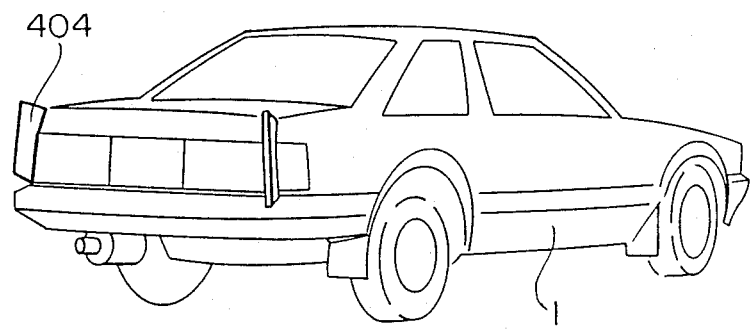
FIG. 19 is a perspective view of an automobile equipped with a fourth embodiment of the air spoiler device in accordance with the present invention.

A fourth embodiment of the air spoiler device of the present invention will be described with reference to FIG. 19. The fourth embodiment has a pair of wing spoiler members 404 which are mounted on the left and right corners of the tail of the automobile body.

Figure 20:
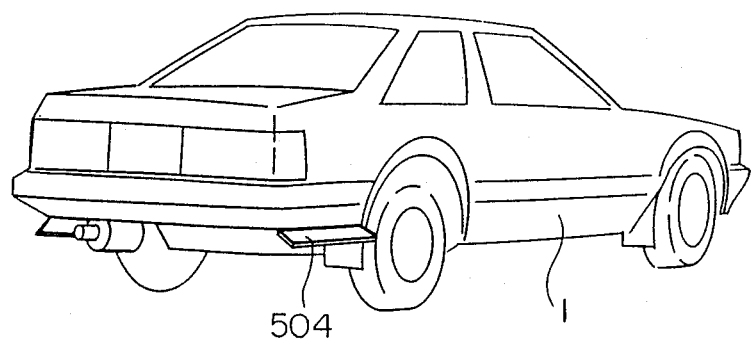
FIG. 20 is a perspective view of an automobile equipped with a first embodiment of the air spoiler device in accordance with the present invention.

FIG. 20 shows a fifth embodiment of the invention in which a pair of wing spoiler members 504 are mounted on lower portions of the tail of the automobile body at the left and right sides thereof. In the fourth and the fifth embodiments of the invention, the driving mechanisms for driving the wing spoiler members are provided in the trunk or under the chassis of the automobile body. Other portions of the fourth end fifth embodiments of the invention may be materially the same as those of the first embodiment, so that further description is omitted in this connection.

The fourth and fifth embodiments of the invention also are effective in forming flow paths of air which interrupt a lateral wind and induce air to the lateral side of the automobile body, so that a negative pressure region on the rear lateral side of the automobile body can be changed into a positive pressure region, with the result that the yawing moment acting on the automobile body is reduced to ensure a higher straight running stability of the automobile.

Figure 21:
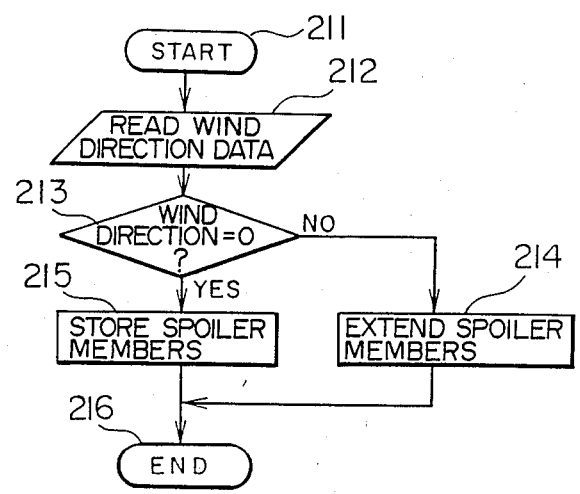
FIG. 21 is a flow chart illustrating the flow of arithmetic operation performed by a modification of the electronic control unit used in the first and the second embodiments of the invention.

In the embodiments of the invention described above, the control devices are designed only to operate to extend the wing spoiler member on the upstream side. This, however, is not exclusive and the circuit arrangement of the electronic control unit may be modified as shown in FIG. 21 so as to enable both wing spoiler members to be extended or stored simultaneously. In this case, the arithmetic operation is commenced in Step 211 and, as in the case of the electronic control unit 1, the wind direction data is read from the wind sensor 10 in Step 212. Subsequently, in Step 213, a judgment is conducted as to whether the wind direction is zero or not, i.e., whether there is any lateral component of wind. If any, the process proceeds from Step 213 to Step 214 in which the electronic control unit issues an operation signal to the driving mechanisms of both wing spoiler members so as to extend both wing spoiler members. If there is no lateral component of wind, the process proceeds to Step 215 in which an operation signal is given to both driving mechanisms to enable them to store both wing spoiler members. In either case, the process then proceeds to Step 216 thus completing one cycle of the arithmetic operation routine.

Figure 22:
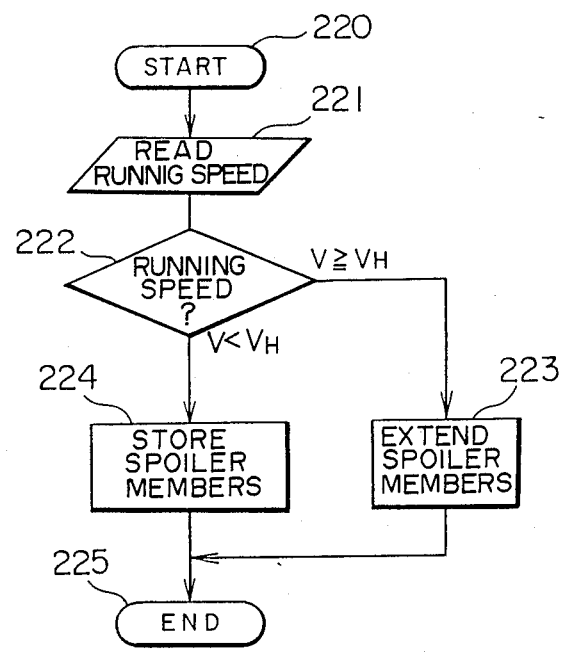
FIG. 22 is a flow chart illustrating the flow of arithmetic operation performed by another modification of the electronic control unit used in the first and the second embodiments of the present invention.

The electronic control unit may be designed and constructed such as to enable both wing spoilers to be extended or stored simultaneously in response to the running speed of the automobile. To this end, a speed sensor is used in place of the wind sensor 10 and the electronic control unit is constructed such as to perform an arithmetic operation as shown in FIG. 22. The speed sensor may be a known one so that description is omitted in this connection.

The arithmetic operation shown in FIG. 22 is commenced in Step 220. In Step 221, the speed V of the running automobile is read from the speed sensor. In Step 222, the speed signal V is compared with a spoiler operation start speed signal $V_h$ which has been set beforehand. Although not exclusively, the spoiler operation start speed signal $V_h$ is set to represent 70 Km/h in this embodiment of the invention. When the automobile speed has become equal to or higher than the spoiler operation start speed, the process proceeds to Step 223 in which the electronic control unit issues wing spoiler extending operation signals to the driving mechanisms associated with both wing spoiler members. The process then proceeds to Step 225. When the detected automobile speed V is still lower than the spoiler operation start speed $V_h$, the process proceeds from Step 222 to Step 224 in which the electronic control unit delivers operation signals for storing both wing spoiler members, and one cycle of arithmetic operation routine is completed in Step 225. With this arrangement, the wing spoiler members are put into use only when the automobile is running at a high speed at which the effects of the wing spoiler members in improving the aerodynamic characteristics are appreciable.

The air spoiler device of the present invention has a very simple construction, as well as remarkably reduced size and weight, while exhibiting a remarkable effect in improving the straight running stability during running of an automobile under action of a lateral wind. In consequence, the driver can be greatly relieved from physical and mental tension during driving at high speed under action of a lateral wind. This not only ensures higher safety but also provides a higher reliability of the automobile itself. Since the air spoiler device of the present invention employs a pair of wing spoiler members which are mounted on the left and right sides of the tail of the automobile body, no substantial increase is caused in the air flow resistance nor in the size of the air spoiler device. In addition, simple and compact driving mechanisms can be employed when the air spoiler device is designed to enable storage of the wing spoiler members.

Although the invention has been described through its preferred embodiments, it is to be understood that the described embodiments of the invention are only illustrative and various changes and modifications may be imparted thereto without departing from the scope of the invention which is limited solely by the appended claims. For instance, the control device may employ a manually operable electrical switch or a valve mechanism capable of controlling the power supply to the wing spoiler member driving mechanisms, so as to enable the driver to manually opeate the wing spoiler members whenever the driver feels it necessary.

What is claimed is:

1. An automotive air spoiler device for an automobile having a body with a front and a rear comprising:
a pair of spoiler members on the left and right lateral sides of the upper side of the rear of the body of the automobile, said spoiler members being arranged at a distance therebetween within a range of from 75% to 83% of the width of said automobile body, each spoiler member extending along its corresponding lateral side and being inclinable laterally at an angle not smaller than 40° and not greater than 70° to the horizontal so as to extend obliquely outwardly from said automobile body thereby interrupting air tending to flow from the corresponding lateral side of the rear of said automobile body to at least one of an upper side and an underside of the rear of said automobile body, said automotive air spoiler device further comprising a rear spoiler, said rear spoiler being provided on an end of said upper side of said rear of said automobile body to extend widthwise thereof and connect at both ends of said rear spoiler with the respective spoiler members.

* * * * *